Jan. 11, 1944.　　　P. M. PAPPAS　　　2,338,964
FRYING APPARATUS
Filed Oct. 27, 1942　　　2 Sheets-Sheet 1
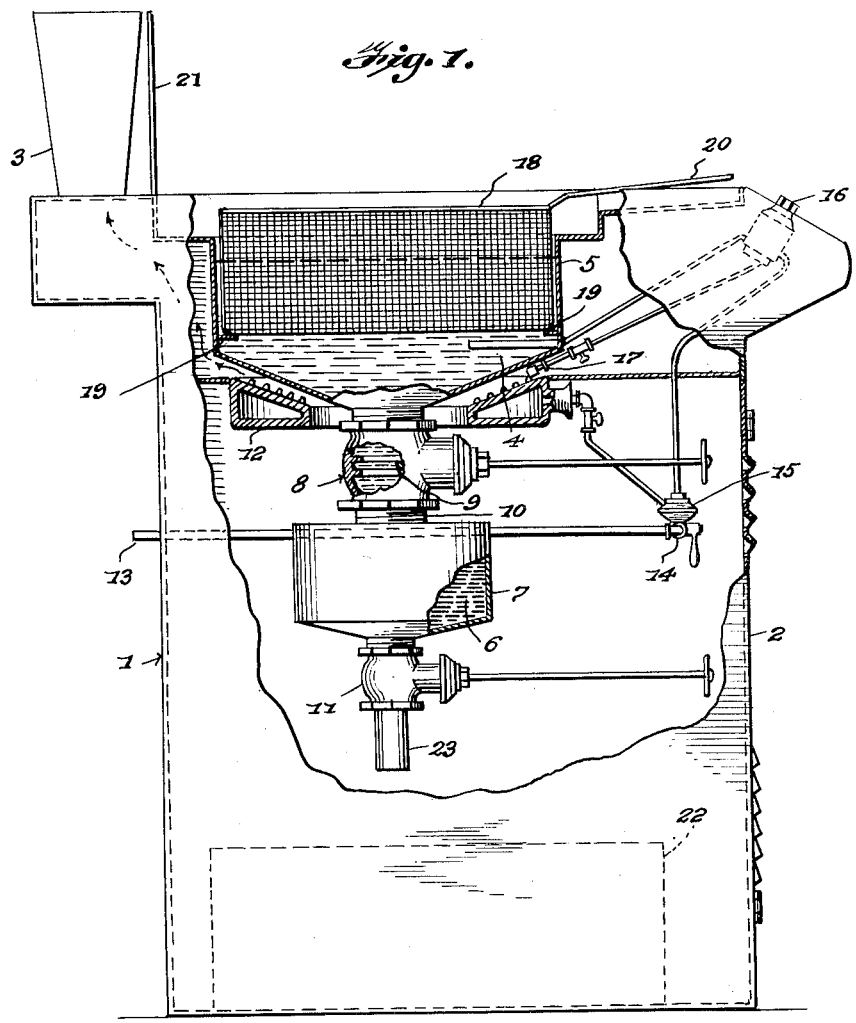
Inventor,
PHILLIP M. PAPPAS.

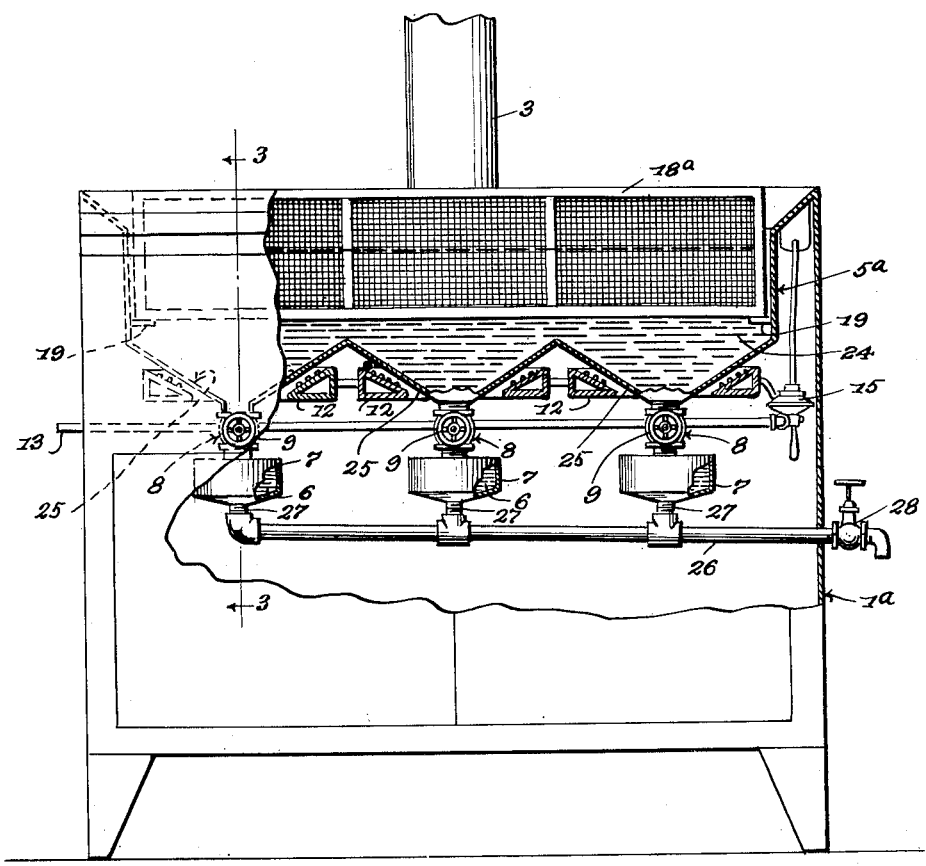

Patented Jan. 11, 1944

2,338,964

UNITED STATES PATENT OFFICE 2,338,964

FRYING APPARATUS

Phillip M. Pappas, Houston, Tex.

Application October 27, 1942, Serial No. 463,549

7 Claims. (Cl. 99—408)

This invention relates to a frying apparatus.

An object of the invention is the construction of a novel and efficient frying apparatus comprising a frying or hot fat compartment and a sediment or cool fat compartment connected preferably by suitable valve means, whereby sediment or food particles from the frying or hot fat compartment are allowed quickly to fall by gravity to the lower or cool fat compartment, which results in keeping the frying fat clear and clean.

Another object of the invention is the construction of the frying compartment section and the sediment compartment section, of separately fabricated material, whereby the heat conductivity from the frying unit to the sediment unit is greately reduced over present frying apparatus, and this prevents the charring or burning of the food particles that fall by gravity into the sediment or cool fat compartment during the frying operation; the elimination of the charring and burning of food particles (sediment) results in longer life of the frying fats used.

A still further object of the invention is the construction of a novel apparatus in which the cool fat particles (sediment in the cool compartment) are prevented from circulating with the hot fat, thereby insuring against transfer of food flavors, and also preventing objectionable carbon particles from being deposited on food being fried.

Another object of the invention is the construction of a novel apparatus in which the sediment-containing fat can be easily drained off, for straining, without disturbing the frying fat.

Another object of the invention is the construction of a frying apparatus in which the unit containing the sediment or food particles can be easily detached for the purpose of substituting a similar unit of greater or less capacity, depending on the kind of food to be fried.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a view partly in vertical section and partly in side elevation of an apparatus constructed in accordance with the present invention.

Figure 2 is a view of another embodiment of the present invention, shown partly in vertical section and partly in elevation.

Figure 3 is a vertical sectional view taken on line 3—3, Figure 2, and looking in the direction of the arrows.

Referring to the drawings, in which Figure 1 shows the preferred embodiment of my invention, I designates a cabinet which may be of any standard design, and this cabinet is provided with a door 2 and a flue 3. The cabinet I constitutes a suitable support for my frying apparatus.

The frying apparatus comprises a frying compartment 4 formed within a container 5. A sediment compartment 6 is formed within a container 7, and the containers 5 and 7 are connected by a valve casing 8. The valve casing 8 is preferably provided with a standard gate valve 9. The container 7 is preferably screwed at 10 into valve casing 8 whereby containers of different sizes may be attached to the valve 8 depending upon the uses to which the apparatus is applied.

The container 7, like the container 5, is provided with an inclined or substantially funnel-shape bottom to facilitate the rapid passage of sediment to the valve casings, as 8 and 11; the valve casing 11 and its valve are provided for draining the sediment compartment 6.

A suitable heating means such as gas burner 12 is positioned under the container 5, and this burner 12 is provided with a suitable inlet supply pipe 13 that communicates with main shut-off valve 14 and thence through the diaphragm cut-off valve 15 to the burner 12.

A thermostat 16 is provided and is connected to pilot light 17.

A basket 18 normally rests upon supports 19. The basket is provided with a comparatively long handle 20, whereby it is easily manipulated. A back splash and basket hanger 21 is provided near flue 3, at the rear of the cabinet I.

A suitable receptacle is shown by dotted lines 22, within the cabinet I, for the sediment, which can be discharged therein through pipe 23, depending from the drain valve 11.

When it is desired to cook larger quantities of food than the frying apparatus in Figure 1 would accommodate, I provide a frying compartment 24 (Fig. 2) of considerable dimensions, which necessitates a plurality of inclined or funnel shape units 25 for constituting the bottom of the container 5a. A plurality of valve casings 8 is employed and each valve casing has detachably connected thereto a container 7. Under each unit 25 is preferably a burner 12, which is connected in any suitable manner to the source of gas supply, whereby the heating of the several units 25 is simultaneous. A sediment discharge pipe 26 is connected by pipes 27 to the several sediment containers 7. A suitable valve 28 is mounted upon pipe 26 and controls the discharge of sediment in pipe 26. A comparatively large basket 18a is provided that rests upon horizontal support 19 of cabinet 1a.

During the frying operation the valve 9 is open, so that sediment or food particles can and will quickly pass through casing 8 into the sediment compartment 6 of container 7. It is to be noted that the burner 12 is between the top of the valve casing 8 and the bottom of the hopper-like bottom of the container 5 whereby sufficient heat radiates against the valve casing to keep the grease or fat in the normally open valve from congealing, thereby allowing sediment from said hopper-like bottom to freely and continuously pass into said cold-zone container during the operation of the frying apparatus. When valve 9 is closed and the drain valve 11 is open, the inclined bottom of container 7 will cause the sediment, as well as the liquid fat, to quickly drain through valve 11, thence pipe 23, and into any suitable container that is provided at 22.

It is to be understood that the prompt discharge of the sediment or food particles by the novel construction into the sediment compartment 6 causes the frying fat to be always comparatively clear and clean. Further, by reason of the containers 5 and 7 being separately fabricated, the heat conductivity from the frying container to the sediment is greatly reduced over the present frying apparatus, which novel construction prevents the charring or burning of the food particles in the container 5; the inclined or funnel-shape bottom of the container 5 allows the sediment or food particles to quickly pass from the intensely heated surface above burner 12 to the sediment compartment, which compartment contains liquid fat at a much lower temperature than the fat in frying compartment 4. One of the results of retaining the sediments in the container 7 is that a longer life is obtained for the frying fats, by reason of the fact that they are kept clear and clean. The transfer of food flavors, as when fish are fried first and then potatoes next, is greatly prevented, because carbon particles are not retained in the frying compartment 4 and cannot be deposited on the food being fried. It is also a fact that upon closing valve 9 and opening valve 11 the fat containing the sediment can be easily drained off without disturbing the frying fat in compartment 4. Many other advantages are obtained in my improved frying apparatus.

The sediment unit constituted by the detachable and interchangeable container 7 constitutes a cool zone, whereas the frying unit constituted by the container 5 is a heated or frying zone, both associated with valve devices for accomplishing the efficient and unitary function hereinbefore specifically specified.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such alterations or changes as shall fairly fall within the scope of the appended claims.

What I claim is:

1. As a new article of manufacture, a frying apparatus, comprising a frying container provided with a broad hopper-like bottom, a cold-zone sediment container under said frying container, a single valve casing connected to the lowest point of said hopper-like bottom, said valve casing connected at its lower end to said sediment container, a normally-open valve in said valve casing, and heating means for said frying container whereby heat from said heating means will keep the grease or fat in fluid state in said valve casing and prevent congealing in said open valve, thereby allowing sediment from said hopper-like bottom to freely and continuously pass into said cold-zone container during the operation of said frying apparatus.

2. A frying apparatus, comprising a frying container, a cold-zone sediment container under said frying container, a valve casing connected to said frying container, said valve casing connected to said sediment container, a normally open valve in said valve casing, and heating means for said frying container whereby heat from said heating means will keep the grease or fat in fluid state in said valve casing and prevent congealing in said open valve, thereby allowing sediment from said hopper-like bottom to freely and continuously pass into said cold-zone container during the operation of said frying apparatus.

3. As a new article of manufacture, a frying apparatus comprising a frying container, a cold-zone sediment container under said frying container, a valve casing threaded at its upper end onto said frying container and threaded at its lower end onto said cold-zone sediment container, heating means for said frying container and said valve casing, and a normally open valve in said valve casing, whereby sediment passes freely from the frying container into said cold-zone sediment container during the operation of said frying apparatus.

4. As a new article of manufacture, a frying apparatus comprising a frying container having a bottom composed of a plurality of hopper-like units, each hopper-like unit being provided with heating means, a valve casing connected to said hopper-like unit and extending below said heating means, a cold-zone sediment container connected to said valve casing, a normally open valve in said valve casing, a single drain means, and means connecting said drain means to all of said cold-zone sediment containers.

5. In a frying apparatus, the combination of a frying container, a sediment container under said frying container, means connecting said frying and sediment containers, and heating means for said frying container.

6. In a frying apparatus, the combination of a frying container, a sediment container under said frying container, means detachably connecting said frying and sediment containers, whereby different size sediment containers may be used or substituted, and heating means for said frying container.

7. In a frying apparatus, the combination of a frying container, a sediment container under said frying container, a detachable valved connection supporting said sediment container bodily upon said frying container, whereby different size sediment containers may be used, and heating means for said frying container.

PHILLIP M. PAPPAS.